(12) United States Patent
Bangor et al.

(10) Patent No.: US 8,081,747 B2
(45) Date of Patent: Dec. 20, 2011

(54) SYSTEM AND METHOD OF MANAGING TELEPHONE CALLS WITHIN A VOICE OVER INTERNET PROTOCOL TELEPHONE SYSTEM

(75) Inventors: Aaron W. Bangor, Austin, TX (US); Jeffrey L. Brandt, Cedar Park, TX (US); Douglas F. Reynolds, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1061 days.

(21) Appl. No.: 11/214,477

(22) Filed: Aug. 29, 2005

(65) Prior Publication Data

US 2007/0047532 A1     Mar. 1, 2007

(51) Int. Cl.
*H04M 3/42* (2006.01)
(52) U.S. Cl. .............. 379/210.02; 379/188; 379/200; 379/88.17; 379/356.01; 379/201.01; 379/156; 379/157; 370/351; 370/352; 370/259; 455/414.1; 455/417
(58) Field of Classification Search .......... 379/210.02, 379/88.17, 356, 201.01, 157–158, 188, 200; 370/446, 351–352, 259–271, 357–427; 455/414.1–417, 566
See application file for complete search history.

(56) References Cited

U.S. PATENT DOCUMENTS

| | | | |
|---|---|---|---|
| 5,802,157 A * | 9/1998 | Clarke et al. ................ | 379/196 |
| 6,097,804 A | 8/2000 | Gilbert et al. | |
| 6,181,776 B1 * | 1/2001 | Crossley et al. .......... | 379/32.01 |
| 6,785,266 B2 * | 8/2004 | Swartz ........................ | 370/352 |
| 7,400,717 B2 * | 7/2008 | Baumeister et al. ..... | 379/210.02 |
| 2002/0068605 A1 | 6/2002 | Stanley | |
| 2002/0085535 A1 * | 7/2002 | Williams .................... | 370/352 |
| 2003/0053444 A1 | 3/2003 | Swartz | |
| 2003/0215078 A1 | 11/2003 | Brahm et al. | |
| 2004/0208304 A1 * | 10/2004 | Miller ..................... | 379/210.02 |
| 2005/0025182 A1 * | 2/2005 | Nazari ........................ | 370/469 |
| 2006/0056388 A1 * | 3/2006 | Livingood ................... | 370/352 |
| 2006/0282393 A1 * | 12/2006 | Sladek et al. ................. | 705/59 |
| 2007/0036143 A1 * | 2/2007 | Alt et al. ..................... | 370/352 |

OTHER PUBLICATIONS

International Search Report and Written Opinion of the International Searching Authority for International Application No. PCT/US06/28596, Mailed on Jun. 3, 2008.

* cited by examiner

*Primary Examiner* — Vivian Chin
*Assistant Examiner* — Paul Kim
(74) *Attorney, Agent, or Firm* — Toler Law Group

(57) ABSTRACT

A voice over Internet protocol (VoIP) telephone server is disclosed and includes a computer readable medium that is accessible to a processor. A centralized address book is embedded within the computer readable medium. Further, a computer program is embedded within the computer readable medium and the computer program utilizes the centralized address book to selectively restrict incoming telephone calls and outgoing telephone calls. The centralized address book can include a plurality of address books and each of the plurality of address books is associated with a corresponding VoIP telephone coupled to the VoIP telephone server. The computer program can include instructions to determine whether an address book only calling lock is on for the VoIP telephone. Moreover, the computer program can include instructions to determine whether an originating telephone number associated with an incoming telephone is stored within the centralized address book.

21 Claims, 6 Drawing Sheets

SYSTEM AND METHOD OF MANAGING TELEPHONE CALLS WITHIN A VOICE OVER INTERNET PROTOCOL TELEPHONE SYSTEM

FIELD OF THE DISCLOSURE

The present disclosure relates to voice over Internet protocol telephone systems.

BACKGROUND

Restricting telephone calls to and from particular telephone numbers is a relatively important feature within the telecommunications industry. At home, these restrictions can prevent children from calling unapproved telephone numbers or long distance telephone numbers, which can result in an increased telephone bill. In businesses, the same problems can arise for shared telephones, e.g., telephones within conference rooms, lobbies, guest offices, etc. Traditionally, for landline telephones, dialing restrictions can utilize network parameters to determine when a call should be completed. For example, landline systems can includes restrictions that can prevent pay calls to information services, domestic long distance calls, international long distance calls, premium calls, collect calls, etc. Wireless telephones can include similar restrictions.

Unfortunately, network-based restrictions are not personalized to individual user telephones and the wireless telephone solution is limited to the wireless handset. These approaches are not effective in a voice over Internet protocol (VoIP) system in which telephones can be moved around frequently.

Accordingly, there is a need for an improved system and method of managing telephone calls within a VoIP system.

DETAILED DESCRIPTION OF THE DRAWINGS

Figure 1:
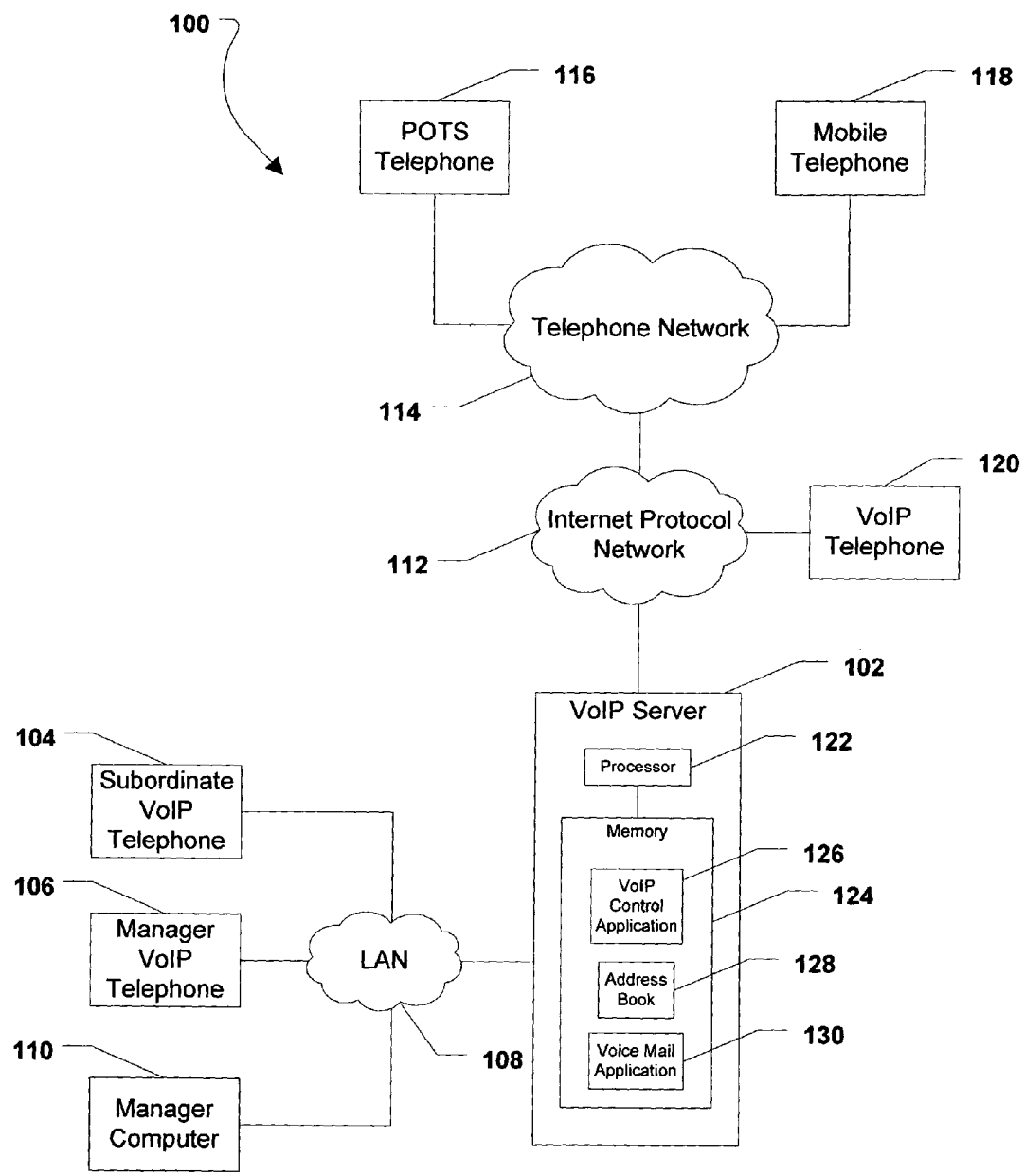
FIG. 1 is a block diagram that illustrates one embodiment of a voice over Internet protocol telephone system.

A voice over Internet protocol (VoIP) telephone server is disclosed and includes a computer readable medium that is accessible to a processor. A centralized address book is embedded within the computer readable medium. Further, a computer program is embedded within the computer readable medium and the computer program utilizes the centralized address book to selectively restrict incoming telephone calls and outgoing telephone calls.

In a particular embodiment, the centralized address book includes a plurality of address books and each of the plurality of address books is associated with a corresponding VoIP telephone coupled to the VoIP telephone server. In another particular embodiment, the computer program includes instructions to determine whether an address book only calling lock is on for the VoIP telephone. Additionally, in a particular embodiment, the computer program includes instructions to determine whether an originating telephone number associated with an incoming telephone is stored within the centralized address book.

In still another particular embodiment, the computer program includes instructions to accept the incoming telephone call when the originating telephone number is stored within the centralized address book. In another particular embodiment, the computer program also includes instructions to determine whether voice mail is available. Additionally, the computer program can include instructions to block the incoming telephone call when the originating telephone number is not stored within the centralized address book and when voice mail is not available and instructions to forward the incoming telephone call to voice mail when the originating telephone number is not stored within the centralized address book and when voice mail is available.

In another particular embodiment, the computer program includes instructions to receive an outgoing call attempt to a telephone number and instructions to determine whether the telephone number is stored within the centralized address book. Further, the computer program further includes instructions to connect the outgoing call when the telephone number is stored within the centralized address book and instructions to block the outgoing call when the telephone number is not stored within the centralized address book.

In another embodiment, a voice over Internet protocol (VoIP) telephone system is disclosed and includes at least one subordinate VoIP telephone, at least one manager VoIP telephone, a VoIP server that is coupled to the at least one subordinate VoIP telephone and the at least one manager VoIP telephone over an Internet protocol (IP) telephone. The VoIP server includes a processor, a computer readable medium that is accessible to the processor, and a centralized address book that is embedded within the computer readable medium. The centralized address book includes one or more telephone numbers and the centralized address book is selectively used to control incoming telephone calls and outgoing telephone calls based on the one or more telephone numbers.

In still another embodiment, a method of managing incoming telephone calls is provided and includes receiving an incoming telephone call, determining whether an originating telephone number associated with the incoming telephone is stored within a centralized address book, and accepting the incoming telephone call when the originating telephone number is stored within the centralized address book.

In yet another embodiment, a method of managing outgoing calls is disclosed and includes processing a call request of an outgoing call attempt to a telephone number, determining whether the telephone number is stored within a centralized address book, and connecting the outgoing call when the telephone number is stored within the centralized address book.

Figure 6:
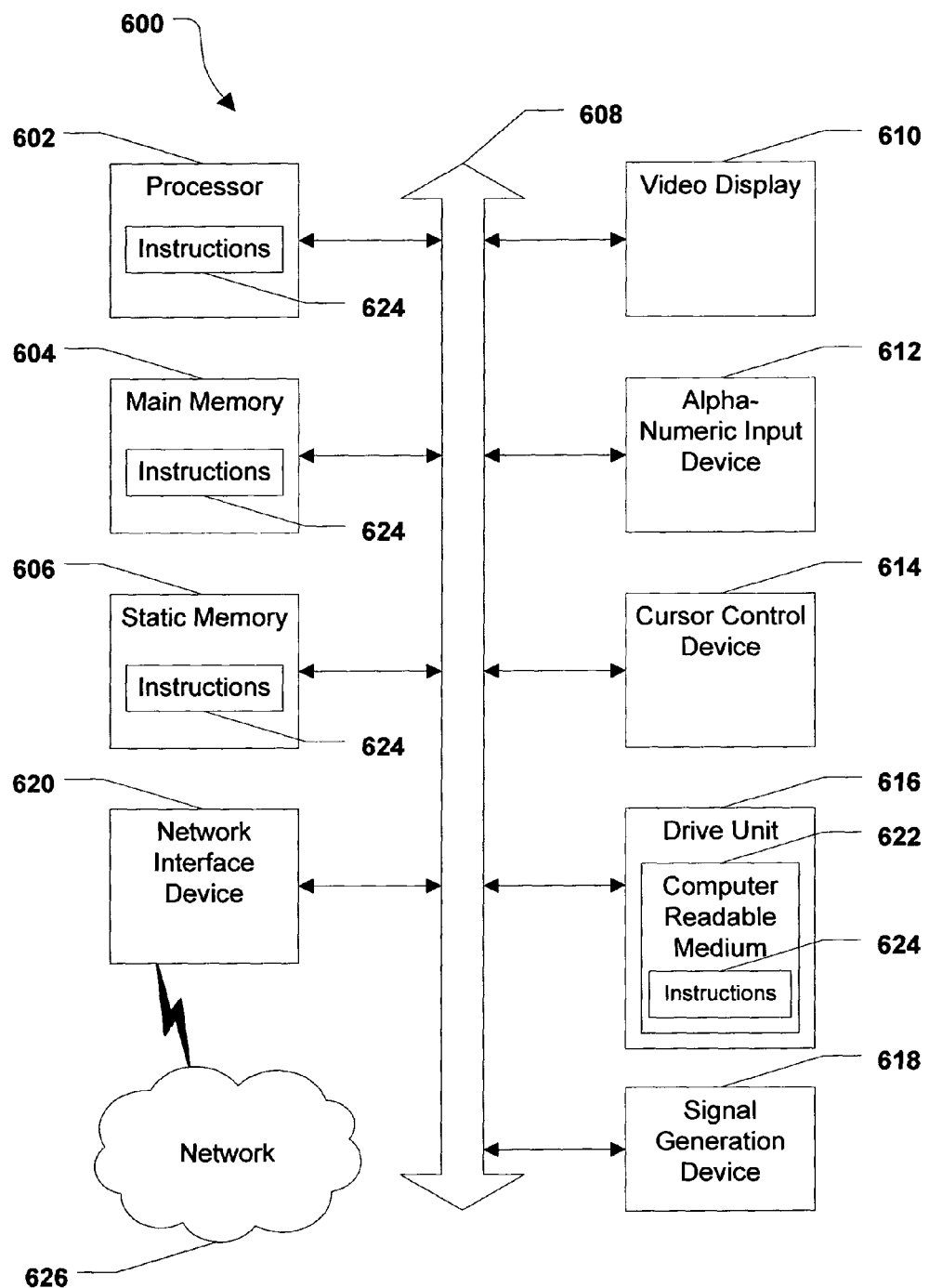
FIG. 6 is a block diagram that is representative of a general computing system.

FIG. 1 illustrates an exemplary, non-limiting embodiment of a voice over Internet protocol (VoIP) telephone system that is generally designated 100. As shown in FIG. 1, the system includes a VoIP server 102 that is coupled to a subordinate VoIP telephone 104 and a manager VoIP telephone 106 via a local area network (LAN) 108. Further, the VoIP server 102 can be coupled to a manager computer 110 via the LAN 108. FIG. 6, described below, depicts an exemplary non-limiting embodiment of a computing system that may be used as the VoIP server 102.

As indicated in FIG. 1, the VoIP server 102 can be coupled to an Internet protocol (IP) network 112. Further, the IP network 112 can be coupled to a telephone network 114, e.g., a public switched telephone network (PSTN) or a cellular telephone network. Accordingly, the telephone network 114 can provide connectivity from the VoIP server 102 to a plain old telephone service (POTS) telephone 116 or a cellular telephone 118. As illustrated in FIG. 1, a remote VoIP telephone 120 can be coupled to the IP network. As such, the IP network 112 can provide connectivity from the VoIP server 102 to the remote VoIP telephone 120.

In a particular embodiment, as shown in FIG. 1, the VoIP server 102 can include a processor 122 and a computer readable medium, e.g., a memory 124, that is accessible to the processor 122. As shown in FIG. 1, a VoIP control application 126 can be embedded within the memory 124. Further, a centralized address book 128 can be embedded within the memory 124. Also, a voice mail application 130 can be embedded within the memory 124.

In another particular embodiment, the VoIP control application 126 can manage outgoing calls from VoIP telephones 104, 106 within the VoIP system 100. For example, when a caller attempts to make a call from a VoIP telephone 104, 106 the VoIP server 126 can determine whether an address book only calling lock feature of the VoIP control application 126 is on. If so, the VoIP control application 126 can interact with the centralized address book 128 to only allow calls to telephone numbers stored within the centralized address book 128 for the VoIP telephone 104, 106 from which the outgoing call is attempted.

In another embodiment, the VoIP control application 126 can manage incoming calls to the VoIP telephones 104, 106. In a particular embodiment, as described in detail below, the VoIP control application 126 can utilize the centralized address book 128 as the basis for the controls. In an illustrative embodiment, the address book 128 can include telephone numbers, email addresses, short message service (SMS) addresses, instant messaging nicknames, etc.

In a particular embodiment, the centralized address book 128 can be accessed over an Internet protocol (IP) network from various user end points, e.g., a VoIP telephone 104, 106 or a computer 110. For example, the manager computer 110 can access the centralized address book 128 via the LAN 108 using hypertext transfer protocol (HTTP). In a particular embodiment, the centralized address book 128 can include a plurality of address books and each of the plurality of address books can be associated with each of a plurality of telephones operating within the system 100. Further, each address book 128 within the centralized address book 128 can be associated with a user account that is controllable by an administrative account, e.g., a manager. Alternatively, the centralized address book 128 can include a mechanism for special access privileges for individual users, e.g., a second password authentication.

If calling restrictions on a subordinate user are imposed by a manager, incoming and/or outgoing telephone calls can be restricted based on the telephone numbers stored in the address book. As such, the subordinate user may not be able to edit their address book, but only view the address book. Further, calls made to and from addresses, e.g., telephone numbers, not within the address book can be blocked. Also, alternative means of establishing a telephone call, e.g., clicking on a telephone number at a web page, can be disabled. Moreover, when a subordinate user relocates his or her VoIP telephone, or changes to a different VoIP telephone, the controls remain in place because the address book is centralized.

Figure 2:
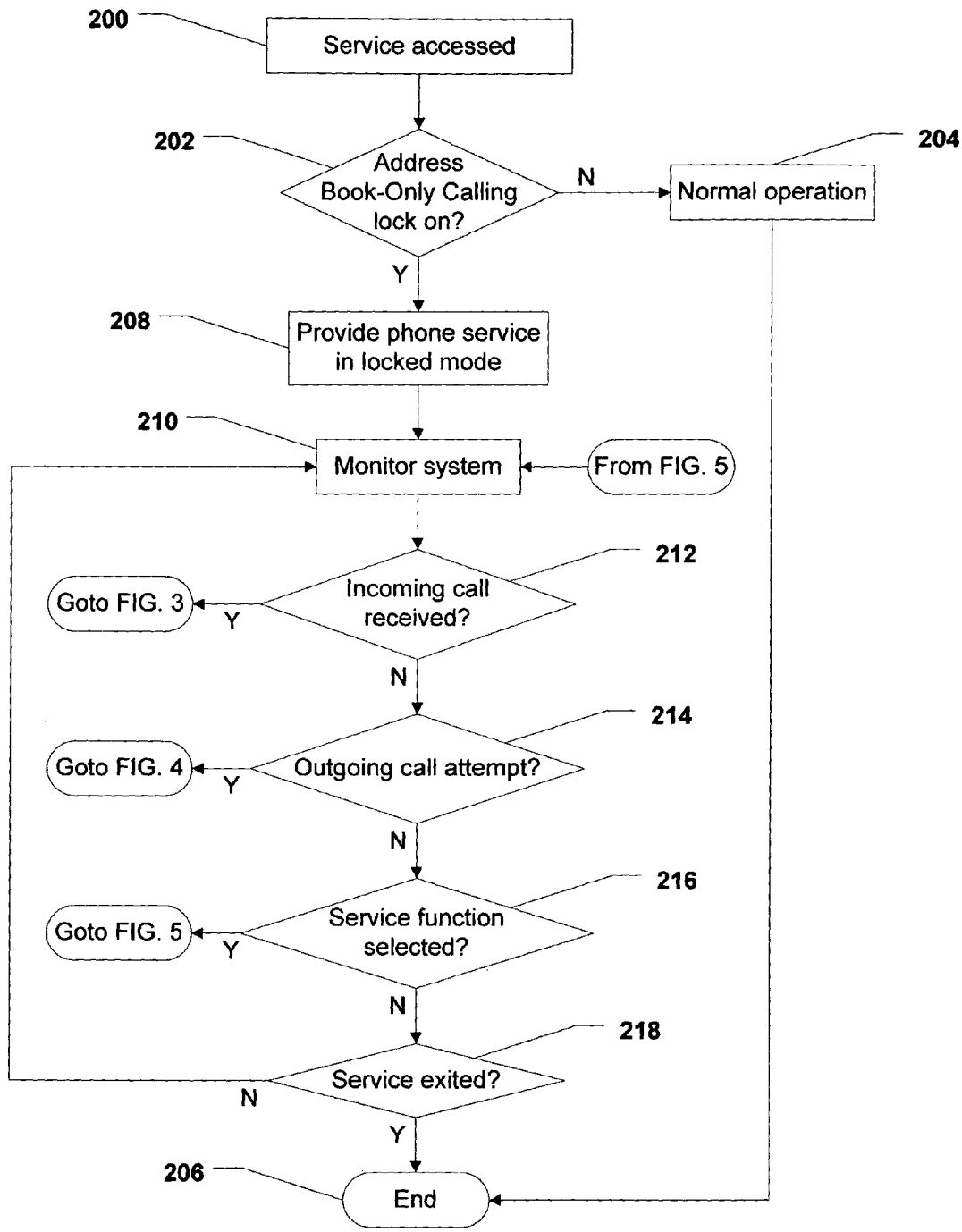
FIG. 2 through FIG. 5 are flow charts illustrating a method of managing telephone calls within a voice over Internet protocol telephone system.

Referring to FIG. 2, a method of managing calls in a voice over Internet protocol (VoIP) system is shown and commences at block 200 wherein a control application at a VoIP server is accessed. At decision step 202, the VoIP server determines whether an address book only calling lock for a particular telephone is active within the VoIP server. In a particular embodiment, the system can include multiple address books stored at a central location and the address book only calling lock can be a feature available on an individual basis.

At decision step 202, if the address book only calling lock is not on, the method proceeds to block 204 and normal operation is permitted, e.g., outgoing calls can be made as desired and incoming calls can be received as desired. The method then ends at state 206.

Conversely, if the address book only calling lock is on, the method continues to block 208 and the VoIP server provides phone service in the locked mode. At block 210, the VoIP server monitors the system, i.e., the VoIP server monitors outgoing call attempts and incoming calls. Proceeding to decision step 212, the VoIP server determines whether an incoming call is received.

Figure 3:
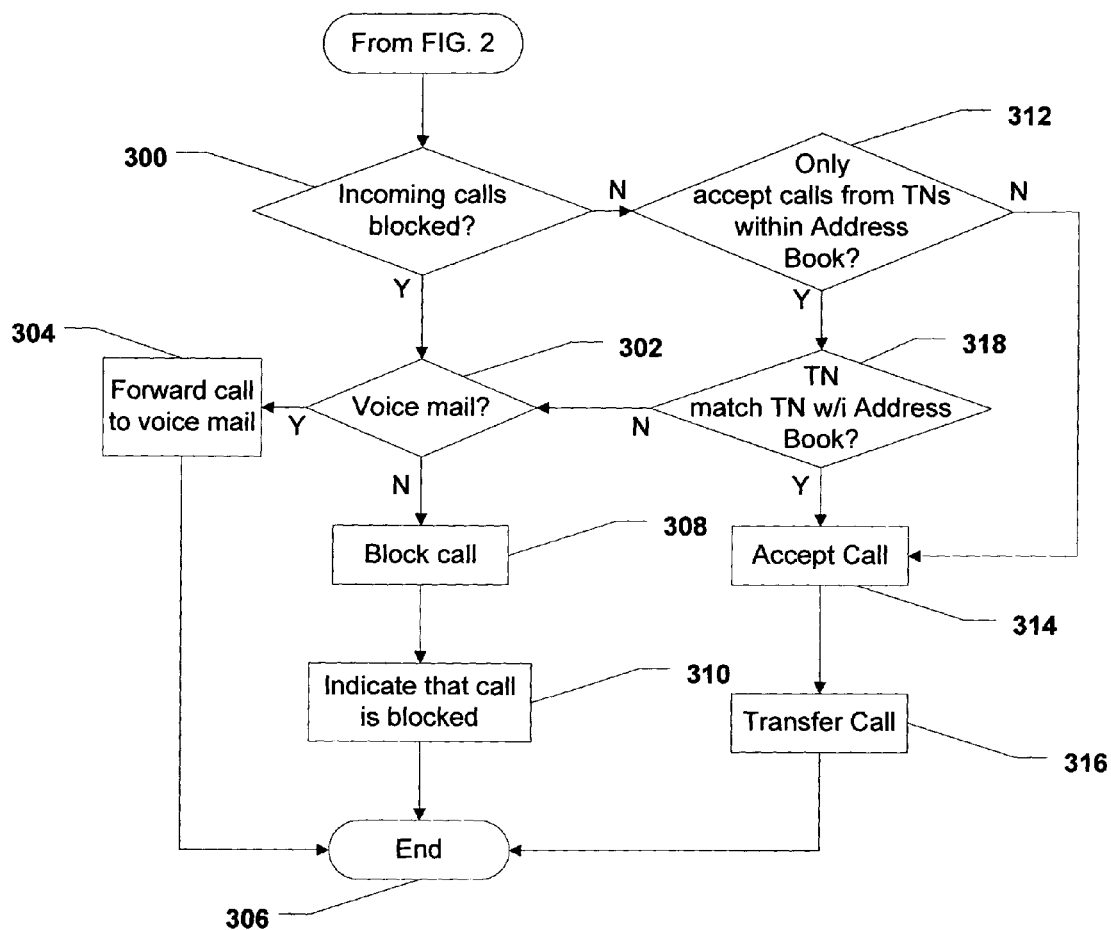

When an incoming call is received, the method proceeds to decision step 300 shown in FIG. 3. At decision step 300, the VoIP server determines whether all incoming calls are blocked. If all incoming calls are blocked, the method continues to decision step 302 and the VoIP server determines whether voice mail is available for the target telephone number. If voice mail is available for the target telephone number, the method proceeds to block 304 and the VoIP server forwards the incoming call to the voice mail associated with the target telephone number. The method then ends at state 306.

Returning to decision step 302, if voice mail is not available for the target telephone number, the method proceeds to block 308 and blocks the call. At block 310, the VoIP server indicates to the caller that the call is blocked. The method ends at state 306.

Returning to decision 300, when all incoming calls are not blocked, the method proceeds to decision step 312 and the VoIP server determines whether to only accept calls from telephone numbers within the address book. If not, the method proceeds to block 314 and the VoIP server accepts the call. At block 316, the VoIP server transfers the call to the target telephone number serviced by the VoIP server. The method then ends at state 306.

Returning to decision step 312, when the VoIP server only accepts calls from telephone numbers within the address book, the method proceeds to decision step 318 and the VoIP server determines whether the telephone number associated with the incoming call matches a telephone number within the address book. In a particular embodiment, an unavailable or blocked telephone number can be considered a non-matching telephone number. When the incoming telephone number matches a telephone number within the address book, the method proceeds to block 314 and continues as described herein. On the other hand, when the incoming telephone number does not match a telephone number within the address book, the method proceeds to decision step 302 and continues as described.

In an alternative embodiment, at decision step 312, the VoIP server can determine whether to only accept incoming telephone calls that are made to telephone numbers within the address book. As such, the VoIP server can manage which users of the VoIP system can receive calls from outside of the VoIP system.

Returning to decision step 212, shown in FIG. 2, when an incoming call is not received, the method proceeds to decision step 214 and the VoIP server determines whether any telephone within the VoIP system has attempted an outgoing call.

Figure 4:
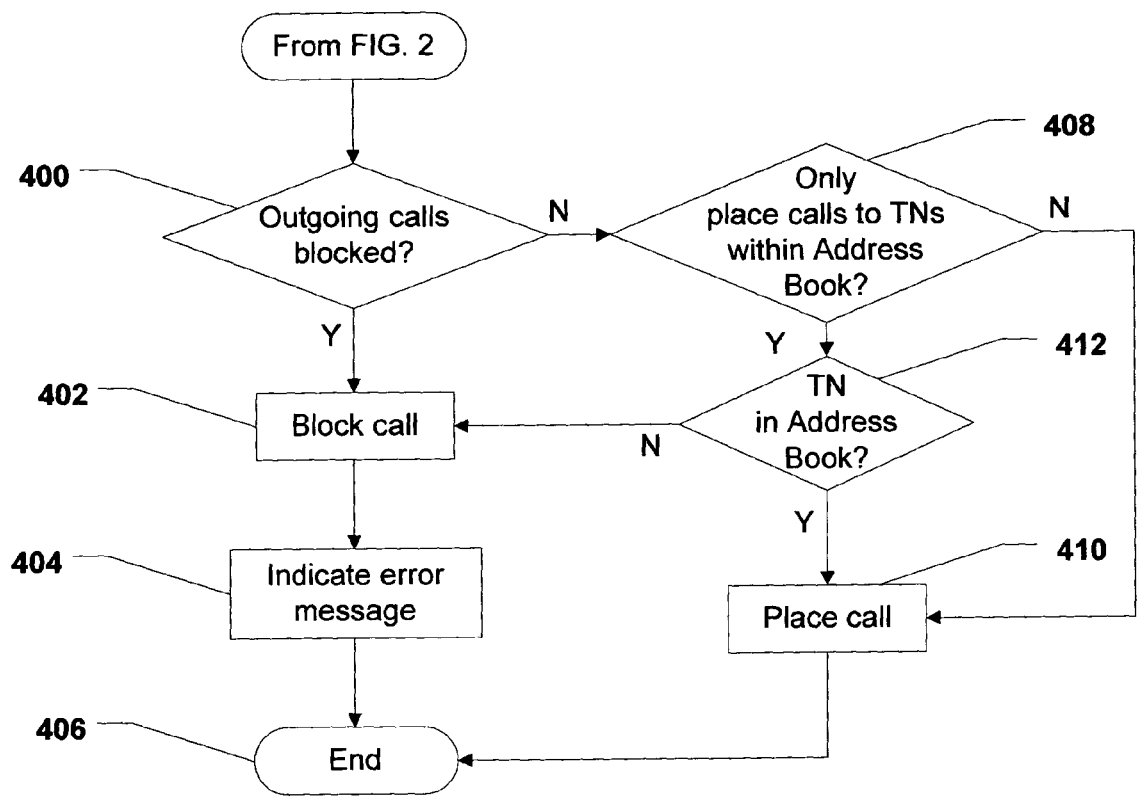

When an outgoing call is attempted, the method proceeds to decision step 400 illustrated in FIG. 4. At decision step 400, the VoIP server determines whether all outgoing calls are blocked. If so, the method proceeds to block 402 and the VoIP server blocks the outgoing call. At block 404, the VoIP indicates an error message to the caller telephone. In a particular embodiment, the error message can be a voice message that is transmitted over the telephone. Alternatively, the error message can be displayed at a display device, e.g., a liquid crystal display (LCD), at the telephone. The method then ends at state 406.

Returning to decision step 400, when all outgoing calls are not blocked, the method proceeds to decision step 408 and the VoIP server determines whether to only place calls to telephone numbers within the address book. If not, the method proceeds to block 410 and the outgoing telephone call is placed. On the other hand, if the VoIP server will only place calls to telephone numbers within the address book, the method proceeds to decision step 412 and the VoIP server determines whether the telephone number associated with the outgoing call matches a telephone number within the address book. If the telephone number does not match, the method proceeds to block 402 and continues as described. On the other hand, if the telephone number does match a telephone number within the address book, the method proceeds to block 410 and the outgoing telephone call is placed. The method ends at state 406.

In an alternative embodiment, at decision step 408, the VoIP server can determine whether to only allow outgoing telephone calls from telephone numbers within the address book. As such, the VoIP server can manage which telephones in the VoIP system can make outgoing calls.

Returning to decision step 214 of FIG. 2, when an outgoing call is not attempted, the method proceeds to decision step 216 and the VoIP server determines whether a VoIP service function is selected. When a VoIP service function is selected, the method proceeds to decision step 500 of FIG. 5. At decision step 500, the VoIP server determines whether the address book is selected. If so, the method proceeds to decision step 502 and the VoIP server determines whether a manager VoIP telephone has selected the address book. When a manager VoIP telephone selects the address book, the method proceeds to block 504 and the VoIP server allows read and write interaction with the address book. Moving to decision step 506, the VoIP server determines whether the user has exited the service function. If so, the method then returns to block 216 of FIG. 2. Otherwise, the method returns to decision step 500 and continues as described.

On the other hand, when a manager VoIP telephone has not selected the address book, i.e., a subordinate VoIP telephone has selected the address book, the method continues to block 508 and the VoIP server allows read-only interaction with the address book. The method moves to decision step 506 and continues as described.

Figure 5:
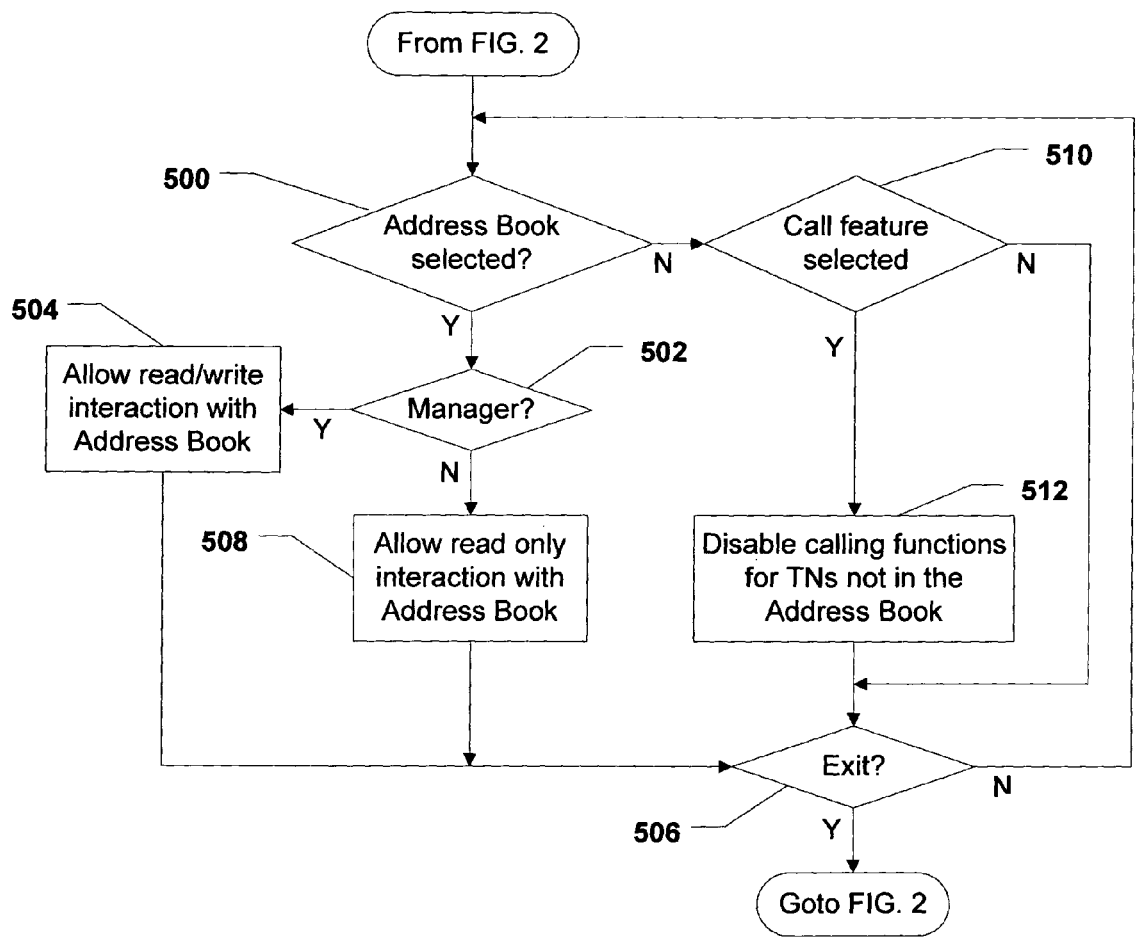

Returning to decision step 500 of FIG. 5, when the address book is not selected, the method proceeds to decision step 510 and the VoIP server determines whether a call feature is selected. If a call feature is not selected, the method continues to decision step 506 and continues as described. Conversely, when a call feature is selected, the method moves to block 512 and the VoIP server disables calling functions for telephone numbers not within the address book. Then, the method proceeds to decision step 506 and continues as described herein.

In a particular embodiment, the centralized address book within the VoIP server can serve as a "white list," i.e., a list that controls incoming and outgoing telephone calls based on whether a telephone number is on the list. In another embodiment, the centralized address book can serve as a "black list," i.e., a list that controls incoming and outgoing telephone calls based on whether a telephone number is not on the list.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of managing telephone calls within a voice over Internet protocol network provides a way to manage and selectively control incoming and outgoing telephone calls based on the telephone numbers stored within a centralized address book. For example, a VoIP server can use the address book to block telephone calls to any telephone numbers that are not stored within the address book. Additionally, the VoIP server can block accept telephone calls from any telephone, numbers that are not within the address book.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A voice over Internet protocol telephone server comprising:
   a processor;
   a computer readable storage medium accessible to the processor;
   a centralized address book embedded within the computer readable storage medium, wherein the centralized address book comprises a plurality of address books, and wherein each of the plurality of address books is associated with a corresponding voice over Internet protocol telephone, wherein the processor controls communications with the voice over Internet protocol server telephones; and a computer program embedded within the computer readable storage medium, the computer program executable by the processor to:
when the centralized address book is configured as a black list, selectively restrict receiving incoming telephone calls and placing outgoing telephone calls based on the centralized address book, and selectively disable alternative methods of establishing a telephone call,
when the centralized address book is configured as a white list, selectively enable receiving the incoming telephone calls and placing the outgoing telephone calls based on the centralized address book,
enable at least one subordinate voice over Internet protocol telephone to access the centralized address book on a read only basis after the at least one subordinate voice over Internet protocol telephone is moved from a first location to a second location, and
enable at least one manager voice over Internet protocol telephone to access the centralized address book on a read-write basis after the at least one manager voice over Internet protocol telephone is moved from the first location to the second location.

2. The voice over Internet protocol server of claim 1, wherein the computer program comprises instructions to determine whether an originating telephone number associated with an incoming telephone call is stored within the centralized address book.

3. The voice over Internet protocol server of claim 2, wherein the computer program further comprises instructions to determine whether voice mail is available.

4. The voice over Internet protocol server of claim 3, wherein, when the centralized address book is configured as the black list, the computer program further comprises instructions to block the incoming telephone call in response to determining that the originating telephone number is not stored within the centralized address book and that voice mail is not available.

5. The voice over Internet protocol server of claim 3, wherein, when the centralized address book is configured as the black list, the computer program further comprises instructions to forward the incoming telephone call to voice mail in response to determining that the originating telephone number is not stored within the centralized address book and that the voice mail is available.

6. The voice over Internet protocol server of claim 1, wherein the computer program further comprises:
instructions to receive an outgoing call attempt to a telephone number; and
instructions to determine whether the telephone number is stored within the centralized address book.

7. The voice over Internet protocol telephone server of claim 1, wherein selectively disabling the alternative methods of establishing the telephone call comprises disabling an option to initiate, via a web page, a telephone call to a particular phone number.

8. The voice over Internet protocol telephone server of claim 1, wherein the centralized address book is accessible via hypertext transfer protocol.

9. The voice over Internet protocol telephone server of claim 1, wherein the computer program performs a password authentication process to selectively enable access to the centralized address book.

10. The voice over Internet protocol telephone server of claim 1, wherein the computer program blocks the incoming telephone calls and the outgoing telephone calls to numbers that are listed in the centralized address book when the centralized address book is configured as the black list.

11. A voice over Internet protocol telephone system comprising:
at least one subordinate voice over Internet protocol telephone;
at least one manager voice over Internet protocol telephone;
a voice over Internet protocol server coupled to the at least one subordinate voice over Internet protocol telephone and to the at least one manager voice over Internet protocol telephone via a network, wherein the voice over Internet protocol server comprises:
a processor;
a computer readable medium accessible to the processor; and
a centralized address book embedded within the computer readable medium, wherein the centralized address book comprises a plurality of address books, and wherein each address book of the plurality of address books is associated with a corresponding voice over Internet protocol telephone coupled to the voice over Internet protocol telephone server;
wherein the centralized address book includes one or more telephone numbers,
wherein, when the centralized address book is configured as a black list, the processor is configured to selectively restrict receiving incoming telephone calls and placing outgoing telephone calls based on the one or more telephone numbers and to selectively disable alternative methods of establishing a telephone call,
wherein, when the centralized address book is configured as a white list, the processor is configured to selectively enable receiving the incoming telephone calls and placing the outgoing telephone calls based on the one or more telephone numbers,
wherein the centralized address book is accessible on a read only basis by the at least one subordinate voice over Internet protocol telephone after the at least one subordinate VoIP telephone is moved from a first location to a second location, and
wherein the centralized address book is accessible on a read-write basis by the at least one manager voice over Internet protocol telephone after the at least one manager voice over Internet protocol telephone is moved from the first location to the second location.

12. The voice over Internet protocol telephone system of claim 11, wherein, when the centralized address book is configured as the white list, a first outgoing telephone call to a first telephone number that is stored within the centralized address book is placed, but a second outgoing telephone call to a second telephone number that is not stored within the centralized address book is blocked.

13. The voice over Internet protocol telephone system of claim 11, wherein, when the centralized address book is configured as the white list, a first incoming telephone call from a first telephone number that is stored within the centralized address book is received, but second incoming telephone call from a second telephone number that is not stored within the centralized address book is blocked.

14. The voice over Internet protocol telephone system of claim 11, wherein, when the centralized address book is configured as the white list, an incoming telephone call from a telephone number that is not stored within the centralized address book is connected to a voice mail application.

15. The voice over Internet protocol telephone system of claim 11, wherein selectively disabling the alternative methods of establishing the telephone call comprises disabling an option to initiate, via a web page, a telephone call to a particular phone number.

16. A method of managing outgoing calls, the method comprising:
processing a telephone call request to place an outgoing call to a telephone number;
determining whether the telephone number is stored within a centralized address book, wherein the centralized address book comprises a plurality of address books, and wherein each address book of the plurality of address books is associated with a corresponding voice over Internet protocol telephone coupled to a voice over Internet protocol telephone server;
when the centralized address book is configured as a white list, placing the outgoing call in response to determining that the telephone number is stored within the centralized address book; and
when the centralized address book is configured as a black list, prohibiting placing the outgoing call in response to determining that the telephone number is stored within the centralized address book and selectively disabling alternative methods of establishing a telephone call,
wherein the centralized address book is accessible on a read only basis by a subordinate voice over Internet protocol telephone after the subordinate voice over Internet protocol telephone is moved from a first location to a second location, and
wherein the centralized address book is accessible on a read-write basis by a manager voice over Internet protocol telephone after the manager voice over Internet protocol telephone is moved from the first location to the second location.

17. The method of claim 16, further comprising, when the centralized address book is configured as the white list, blocking the outgoing call when the telephone number is not stored within the centralized address book.

18. The method of claim 16, wherein selectively disabling the alternative methods of establishing the telephone call comprises:
determining a status of a calling lock feature;
disabling the alternative methods of establishing the telephone call when the calling lock feature is enabled; and
enabling the alternative methods of establishing the telephone call when the calling lock feature is not enabled.

19. The method of claim 16, further comprising:
receiving an incoming call;
determining whether the incoming call is blocked;
determining whether a voice mail service is available for a target telephone number associated with the incoming call; and
forwarding the incoming call to the voice mail service when the incoming call is blocked and when the voice mail service is available for the target telephone number.

20. A voice over Internet protocol telephone system comprising:
a voice over Internet protocol server comprising:
a processor;
a computer readable medium accessible to the processor; and
a centralized address book embedded within the computer readable medium, wherein the centralized address book comprises a plurality of address books, and wherein each address book of the plurality of address books is associated with a corresponding voice over Internet protocol telephone coupled to the voice over Internet protocol telephone server;
a plurality of subordinate voice over Internet protocol telephones coupled to the voice over Internet protocol server via a network, wherein each subordinate voice over Internet protocol telephone of the plurality of subordinate voice over Internet protocol telephones is associated with a corresponding subordinate address book included in the plurality of address books of the centralized address book and a corresponding subordinate user account, wherein each subordinate user account enables access to the centralized address book on a read only basis;
a manager voice over Internet protocol telephone coupled to the voice over Internet protocol server via the network, wherein the manager voice over Internet protocol telephone is associated with a corresponding manager address book included in the plurality of address books of the centralized address book and a corresponding manager user account, wherein the manager user account enables:
access to the centralized address book on a read-write basis,
designation of the centralized address book to operate as a black list for a first subordinate voice over Internet protocol telephone of the plurality of subordinate voice over Internet protocol telephones, wherein, when the centralized address book is configured as the black list, the processor is configured to selectively restrict receiving incoming telephone calls to the first subordinate voice over Internet protocol telephone and placing outgoing telephone calls from the first subordinate voice over Internet protocol telephone based on the centralized address book,
designation of the centralized address book to operate as a white list for a second subordinate voice over Internet protocol telephone of the plurality of subordinate voice over Internet protocol telephones, wherein, when the centralized address book is configured as the white list, the processor is configured to selectively enable receiving incoming telephone calls to the second subordinate voice over Internet protocol telephone and placing outgoing telephone calls from the second subordinate voice over Internet protocol telephone based on the centralized address book,
wherein a designation of the centralized address book to operate as one of the white list and the black list for a third subordinate voice over Internet protocol telephone of the plurality of voice over Internet protocol telephones remains with the third subordinate voice over Internet protocol telephone when the third subordinate voice over Internet protocol telephone is moved from a first location to a second location.

21. The voice over Internet protocol telephone system of claim 20, wherein, when the centralized address book is designated to operate as a black list for the first subordinate voice over Internet protocol telephone, the second subordinate voice over Internet protocol telephone is prohibited from initiating an outgoing call via a web page, and further enabling designation of a call lock feature for a fourth voice over Internet protocol telephone of the plurality of voice over Internet protocol telephones independent of designating the centralized address book as one of the white list and the black list for the fourth voice over Internet protocol telephone.

* * * * *